United States Patent
Holcombe

(10) Patent No.: US 11,456,965 B2
(45) Date of Patent: *Sep. 27, 2022

(54) NETWORK SERVICE REQUEST THROTTLING SYSTEM

(71) Applicant: Amazon Technologies, Inc., Seattle, WA (US)

(72) Inventor: David L. Holcombe, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 109 days.

This patent is subject to a terminal disclaimer.

(21) Appl. No.: 15/084,823

(22) Filed: Mar. 30, 2016

(65) Prior Publication Data

US 2016/0212060 A1    Jul. 21, 2016

Related U.S. Application Data

(63) Continuation of application No. 12/820,486, filed on Jun. 22, 2010, now Pat. No. 9,313,604.

(51) Int. Cl.
| | |
|---|---|
| *H04L 47/70* | (2022.01) |
| *H04W 28/06* | (2009.01) |
| *H04W 4/50* | (2018.01) |
| *H04L 67/60* | (2022.01) |
| *H04L 67/568* | (2022.01) |
| *H04L 43/16* | (2022.01) |
| *H04L 9/40* | (2022.01) |

(52) U.S. Cl.
CPC ............. *H04L 47/70* (2013.01); *H04L 43/16* (2013.01); *H04L 63/08* (2013.01); *H04L 67/568* (2022.05); *H04L 67/60* (2022.05); *H04W 4/50* (2018.02); *H04W 28/06* (2013.01)

(58) Field of Classification Search
CPC .............................. H04W 4/001; H04W 28/06
See application file for complete search history.

(56) References Cited

U.S. PATENT DOCUMENTS

| | | | |
|---|---|---|---|
| 6,182,109 B1 | 1/2001 | Sharma et al. | |
| 6,804,627 B1 | 10/2004 | Marokhovsky et al. | |
| 7,428,597 B2 | 9/2008 | Beunings | |
| 7,584,275 B2 | 9/2009 | Shirota | |
| 8,144,587 B2* | 3/2012 | Heinz ................. | H04L 12/5695 370/235 |
| 9,071,465 B1* | 6/2015 | Schroeder ............... | H04L 51/38 |
| 2006/0259949 A1* | 11/2006 | Schaefer ........... | G06F 17/30082 726/1 |
| 2007/0118653 A1 | 5/2007 | Bindal | |
| 2007/0157155 A1 | 7/2007 | Peters | |
| 2007/0237535 A1* | 10/2007 | Yoshioka ........... | G03G 15/0806 399/53 |
| 2010/0092207 A1 | 4/2010 | Ito et al. | |

(Continued)

*Primary Examiner* — Joseph L Greene
(74) *Attorney, Agent, or Firm* — Thomas | Horstemeyer, LLP

(57) ABSTRACT

Disclosed are various embodiments for throttling requests for a network service. A request for a network service is received from a client application and parameters are extracted from the request. Throttling policies applicable to the parameters are identified and retrieved, and it is determined whether the request should be processed based at least upon the throttling policies and the request parameters.

20 Claims, 8 Drawing Sheets

(56) References Cited

U.S. PATENT DOCUMENTS

| | | | | |
|---|---|---|---|---|
| 2010/0131668 A1* | 5/2010 | Kamath | ................... | H04L 47/32 |
| | | | | 709/233 |
| 2011/0153724 A1* | 6/2011 | Raja | ...................... | H04L 67/325 |
| | | | | 709/203 |
| 2011/0173681 A1* | 7/2011 | Qureshi | .............. | H04L 63/0823 |
| | | | | 726/4 |

* cited by examiner

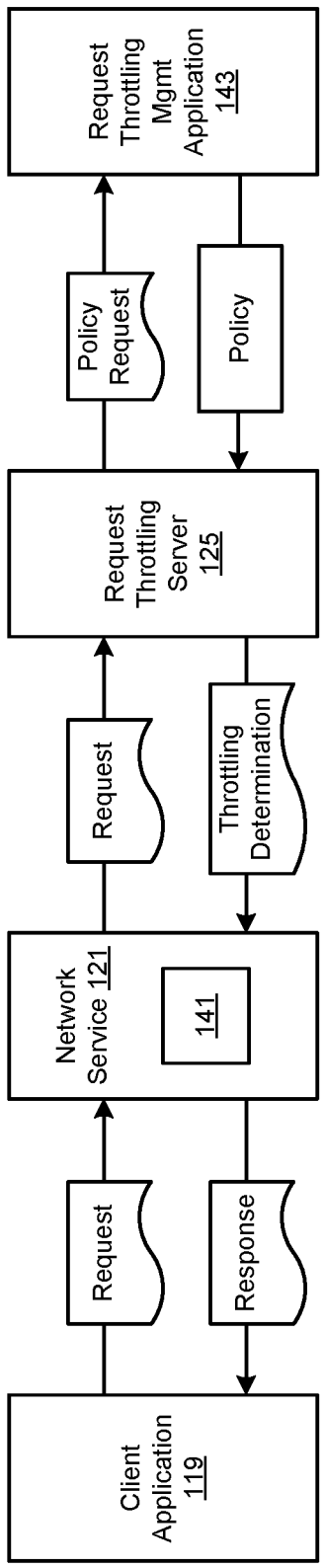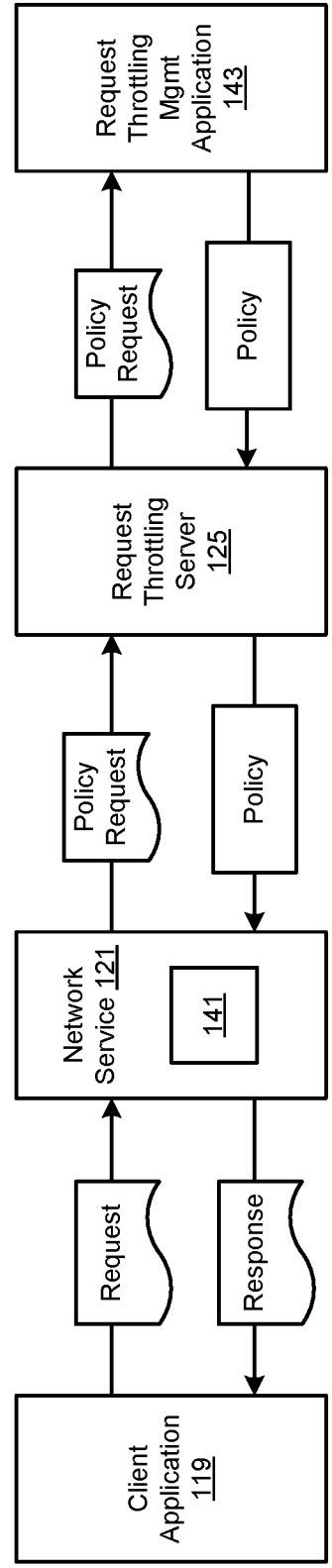

NETWORK SERVICE REQUEST THROTTLING SYSTEM

CROSS-REFERENCE TO RELATED APPLICATIONS

This application is a continuation of and claims the benefit of U.S. patent application Ser. No. 12/820,486, entitled "NETWORK SERVICE REQUEST THROTTLING SYSTEM," and filed Jun. 22, 2010, which is hereby incorporated by reference in its entirety.

BACKGROUND

Network services, such as web services, are often implemented on various computing devices in a networked environment. A particular application implemented on a computing device may utilize application programming interfaces (API's) that are hosted on a remote computing device accessible via a network. Data store services can also be implemented on a remote data store and accessed by a particular application via the network. In such a network service environment, effectively and efficiently throttling access to a particular API, data store, or other network service can facilitate uptime and help ensure the various network services have sufficient capacity to provide services to application clients.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of an example of data flow between components in the networked environment of FIG. 1 according to various embodiments of the present disclosure.

FIG. 3 is a drawing of an example of data flow between components in the networked environment of FIG. 1 according to various embodiments of the present disclosure.

DETAILED DESCRIPTION

In the following discussion, a general description of the system and its components is provided, followed by a discussion of the operation of the same. Embodiments of this disclosure are directed to systems and methods of throttling requests directed to network services. Embodiments of this disclosure facilitate throttling of client access to network services that may be implemented on various computing devices that may be located in disparate locations (e.g., various data centers). As discussed herein, a network service can include a web service, data store, or other computing resource which is accessible over a network. In other words, a network service is accessed via a request that is transmitted over a network to a computing device which is providing functionality of the network service. Accordingly, embodiments of this disclosure grant or deny a request to access a network service based at least upon one or more throttling policies that define various dimensions on which throttling of access to the network service is based.

Figure 1:
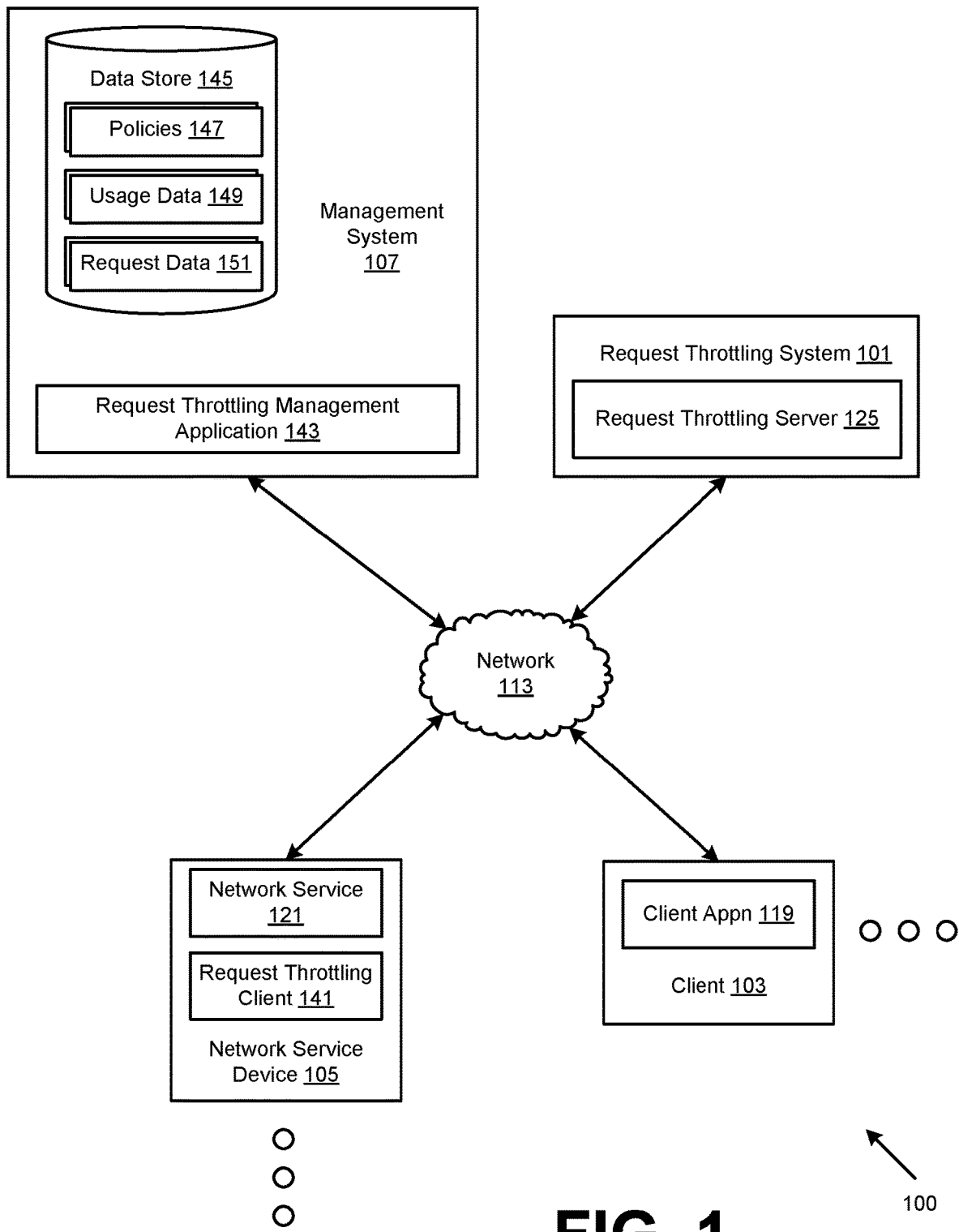
FIG. 1 is a drawing of a networked environment according to various embodiments of the present disclosure.

With reference to FIG. 1, shown is a networked environment 100 according to various embodiments. The networked environment 100 includes a request throttling system 101, one or more clients 103, one or more network service devices 105 implementing a network service, and a management system 107 that are all in communication via a network 113. The request throttling system 101, client 103, network service device 105, and the management system 107 can all be implemented in computing systems or computing devices of varying hardware architectures. Additionally, any or all of the above can be implemented in one computing device, or in any number of computing devices. The depicted example, which illustrates various systems in communication over the network 113, is but one example shown for ease of depiction and discussion herein. The network 113 includes, for example, the Internet, intranets, extranets, wide area networks (WANs), local area networks (LANs), wired networks, wireless networks, or other suitable networks, etc., or any combination of two or more such networks.

A computing device or computing system on which the request throttling system 101, client 103, network service device 105, and/or management system 107 can be implemented may comprise, for example, a server computer or any other system providing computing capability. Alternatively, a plurality of computing devices may be employed that are arranged, for example, in one or more server banks, computer banks or other arrangements. For example, a plurality of computing devices together may comprise, for example, a cloud computing resource, a grid computing resource, and/or any other distributed computing arrangement. Such computing devices may be located in a single installation or may be dispersed among many different geographical locations. In one embodiment, a computing device can represent a virtualized computer system executing on one or more physical computing systems. However, for purposes of convenience, a computing device is referred to herein in the singular. Even though a computing device is referred to in the singular, it is understood that a plurality of computing devices may be employed in the various arrangements as described above.

The components executed on the network service device 105 include, for example, a network service 121, a request throttling client 141, and other applications, services, processes, systems, engines, or functionality not discussed in detail herein. The network service 121 is executed to provide various functionality and/or services to requesting clients.

As one example, the network service 121 implements an application programming interface (API) that can be called or accessed by a client with a remote procedure call. In another example, the network service 121 can be a messaging oriented service that can provide an API that is accessed with extensible markup language (XML) based calls transmitted via the network 113. As another example, the network service 121 can provide an API, data store and/or database functionality for clients that can be accessed via XML messages that follow the Simple Object Access Protocol (SOAP).

In yet another example, the network service 121 can authenticate credentials of a user that are provided in an authorization request transmitted to a network service 121 by a client. Accordingly, the network service 121, in this example, can receive a message containing credentials provided by a user, and the network service 121 can return a Boolean response that indicates whether the user is authenticated. Other variations and examples should be appreciated, and it should further be appreciated that the above examples are merely illustrative and do not constitute an exhaustive list of examples of a network service 121. Also, in the depicted networked environment 100, multiple network services 121 can be implemented on a network service device 105 and multiple network service devices 105 can be accessible via the network 113 as can be appreciated.

The network service device 105 can also execute a request throttling client 141 that facilitates throttling of requests made to the network service 121 in the networked environment 100. In one embodiment, the request throttling client 141 can receive a request to access a network service 121 on behalf of a client application 119, which can be either approved or denied by the request throttling server 125 according to one or more request throttling policies. In other embodiments, the request throttling server 125 can authorize the request throttling client 141 to process requests to access a network service 121 and provide the request throttling client 141 with one or more request throttling policies. In this example, the request throttling client 141 can itself process and then either approve or deny a request for a network service 121 on behalf of a client application 119.

Accordingly, in one embodiment, the request throttling client 141 can be a class library, API, and/or function provided in the network service device 105 that the network service 121 can invoke in order to determine whether a request should be processed. Upon invoking such an API or requesting authorization, the request throttling client 141 and/or request throttling server 125 can approve or deny the request to access the network service 121 according to various throttling policies that they are configured to enforce. As one example, a network service 121 executed in the Java platform on the network service device 105 can access a Java class that implements functionality of the request throttling client 141 as described herein.

The components executed in the request throttling system 101 include for example, a request throttling server 125, and other applications, services, processes, systems, engines, or functionality not discussed in detail herein. The request throttling server 125 is executed to throttle, limit and/or screen requests to access network services 121 provided via one or more network service devices 105. Access to a network service can be throttled in order to prevent and/or detect a denial of service attack, to enforce access restrictions to a particular network service 121, to ensure fairness among clients attempting to access a particular network service 121, to ensure that a given network service 121 and/or requesting client is not consuming excessive network bandwidth and/or computing resources, or other reasons as can be appreciated by a person of ordinary skill in the art.

Accordingly, the request throttling server 125 executed by the request throttling system 101 can throttle requests to a network service 121 by analyzing a request for the network service 121 to determine whether the request results in the violation of a throttling policy. If the request results in the violation of a throttling policy, the request throttling server 125 can reject the request. Mechanisms by which requests are throttled are further discussed in more detail below.

The components executed on the client 103 include, for example, a client application 119 and other applications, services, processes, systems, engines, or functionality not discussed in detail herein. A client application 119 can be any application, software and/or service that may submit a request to a network service 121. In some embodiments, a client 103 can execute a network service 121 that serves requests from other clients 103, and the network service 121 executed on the client can also take the form of a client application 119, as it may submit requests to other network services 121 in order to provide requested functionality to other client applications 119. Accordingly, the client application 119 and network service 121 are depicted in the drawings as being executed in separate devices for ease of depiction and to facilitate discussion of the various embodiments of the disclosure. However, a person of ordinary skill in the art should appreciate that this is but one example of a configuration according to this disclosure. It should be appreciated that in some embodiments, the request throttling client 141 can be executed on a client 103 as well. Accordingly, a client application 119 can facilitate making a throttling determination with respect to requests for network service 121 resources as described herein.

A request from a client application 119 to the network service 121 to access the network service 121 can include various parameters from which throttling decisions can be made depending on the throttling policies that are being enforced in a system according to FIG. 1 and other embodiments. As some non-limiting examples, a request can include a string or other data type that describes an identifier and/or name of a client application 119 that is submitting a request for a network service 121, a user or customer identifier, a name or identifier of the requested network service 121, an internet protocol (IP) address or other network identifier, and the API and/or function requested within the requested network service 121. Additionally, the request can include context specific parameters that can also be used to throttle requests for a network service 121. As one example, in the context of a multi-marketplace electronic commerce system facilitated by various client applications 119 and network services 121, a request for a network service 121 can include a marketplace identifier that identifies a marketplace for which a requested is intended. For example, an electronic commerce system may facilitate multiple electronic storefronts for various retailers and merchants. Accordingly, the marketplace identifier can identify the retailer and/or merchant so that the request throttling system 125 and/or request throttling client 141 can throttle requests for network services 121 based at least upon the marketplace with which the requests is associated.

The components executed on the management system 107 include, for example, a request throttling management application 143 and other applications, services, processes, systems, engines, or functionality not discussed in detail herein. The management system 107 can also include a data store 145 that can store throttling policies 147, usage data 149 and/or request data 151. The throttling policies 147 can define policies, which, if violated, can cause a request from a client application 119 for a network service 121 to be denied. Usage data 149 can store data regarding the usage of a particular network service 121. In other words, the usage data 149 can store data regarding how much usage a particular network service 121 in the networked environment 100 is occurring on behalf of client applications 119.

Usage data 149 can be tracked by the network service 121, the request throttling server 125, and/or the request throttling client 141 and transmitted to the request throttling management application 143 for storage in the data store 145. The usage data 149 of network services 121 can include historical usage data, rate usage data, and data related to the parameters in a request so that request throttling policies can be enforced based the usage data 149 as well as other data. Request data 151 can store data regarding requests submitted by clients 103 in the networked environment 100. As a non-limiting example, the request data 151 can include data regarding the requests submitted by a particular client IP address, which can be tracked and stored in the data store 145. In one embodiment, the request throttling server 125 can throttle requests on the basis of a client 103 IP address. In this example, a throttling policy 147 can be defined that limits requests from an IP address at a certain rate threshold. Because request data 151 can be tracked and historical request data 151 can be maintained in the data store 145 and accessible via the request throttling management application 143, the request throttling server 125 can refuse a request from the client 103 IP address.

The throttling policies 147, usage data 149, and request data 151 can also be cached in the request throttling system 101 and/or client 103 so that they can be retrieved without accessing the management system 107 and its data store 145. Because the request throttling server 125 and/or request throttling client 141 may be potentially required to service large volumes of requests over short periods of time, caching of data on a computing device on which a throttling decision is made can reduce data store 145 accesses as well as reduce the response latency that results from a throttling determination.

The request throttling management application 143 can also provide management functionality so that a user, via a management console and/or a management user interface provided by the request throttling management application 143, can manage and/or define throttling policies 147 which can be enforced by the request throttling server 125 and/or the request throttling client 141. Additionally, a user can view usage data 149 and/or request data 151 to view status and historical throttling data.

Next, a description of the operation of the various components of the networked environment 100 is provided. As described above, the request throttling server 125 can perform throttling of requests on behalf of a client application 119 to access functionality, an API, storage resources, or other computing resources provided by a network service 121. Accordingly, a request throttling client 141 provided on a network service device 105 can facilitate the throttling capabilities of the request throttling server 125. A network service 121 can be configured to invoke functionality of the request throttling client 141 when network service 121 resources are requested by the client application 119. Accordingly, in one embodiment, the request throttling client 141 can generate a request containing parameters with which the request throttling server 125 can determine whether the request to access the network service 121 should be approved or denied. In other words, a network service 121 can receive a request from a client application 119 for network service 121 resources, and the request throttling client 141 can be invoked by the network service 121 in order to submit a request to the request throttling server 125 to determine whether the request should be processed by the network service 121. In other embodiments, the request containing parameters with which a throttling determination can be made is generated by the client application 119.

The request generated by the request throttling client 141 and/or client application 119 can include various parameters describing the identity of the requesting client 103, the client application 119, and/or the requested network service 121 and transmit the request to the request throttling server 125. In some embodiments, the parameters describe properties that are not related to an identity of a device, service or application. As a non-limiting example, the request parameters can describe properties of the request itself, such as data being passed to the requested network service 121, and a request throttling policy can include a policy definition specific to the data. As one example, a request throttling policy may include a policy definition that a given username cannot exceed a certain request rate to a particular network service 121. Accordingly, the request can include a username so that the request throttling server 125 can make a throttling determination on this basis. Accordingly, the request throttling server 125 can extract the parameters from the request and make a determination as to whether access to the requested network service 121 should be granted. To make this determination, the request throttling server 125 can retrieve at least one throttling policy 147 that corresponds to the extracted parameters from the request throttling management application 143.

Policies 147 that correspond to the various dimensions of a request on which throttling determinations can be made, and can be stored in the data store 145. As one example, a policy 147 can be defined that specifies that any one IP address cannot exceed a certain request rate at any given time. Accordingly, the request throttling server 125 can retrieve request data 151 corresponding to an IP address from which a request is received and determine whether the request rate is exceeded. If the request rate is exceeded in this example, the request throttling server 125 can deny, or "throttle," the request from the client 103 IP address and transmit a denial message to the request throttling client 141. If executed in a network service device 105, the request throttling client 141 can then transmit a denial to the client application 119. If the request rate is not exceeded, the request throttling server 125 can transmit an approval to response to the request. If executed in a network service device 105, the request throttling client 141 can then allow the network service 121 to process the request.

Additionally, the request throttling server 125 can also facilitate tracking and reporting of requests to the request throttling management application 143 so that usage data 149 and request data 151 in the data store 145 are updated with accurate data. Therefore, in the above example, the request throttling server 125 can, in conjunction with making a throttling determination, generate a reporting object corresponding to the parameters extracted from the request and transmit the reporting object to the request throttling management application 143. By way of illustration, the request throttling server 125 can generate a reporting object that contains fields corresponding to the various parameters of the request. The request throttling management application 143 can then update usage data 149 and request data 151 accordingly.

Reporting objects can also be tuned so that they are reported to the request throttling management application 143 by the request throttling server 125 on a periodic basis so that, during periods of high volume servicing of requests, computing resources of the request throttling system 101 can be devoted to making throttling determinations rather than transmitting reporting objects to the request throttling management application 143. In some embodiments, reporting objects can be configured with a counter and placed in a reporting queue for periodic reporting and/or reporting when computing resources are available. Accordingly, a reporting object can be created when a request is serviced by the request throttling server 125 for which a reporting object has not been created and placed in a reporting queue. A request counter in the reporting object can incremented each time the request throttling server 125 receives an additional request having parameters that match those in the reporting object and is serviced by the request throttling server 125. In this way, the amount of data transferred to the request throttling management application 143 can be minimized and the reporting schedule optimized so that performance of throttling by the request throttling server 125 is improved.

The request throttling server 125 can also throttle requests for network service 121 resources based on historical and/or cumulative request data 151 and/or usage data 151. As one example, in the context of an electronic commerce system, a policy 147 can be defined that specifies that a particular customer identifier cannot access a particular network service 121 more than a certain number of times over a period of a month. The request throttling server 125 can determine from historical usage data 149 and/or request data 151 whether a new request made by the customer identifier would violate such a policy.

To further improve performance of the throttling of requests in the networked environment 100, the request throttling server 125 can authorize the request throttling client 141 to perform throttling of requests for network services 121 made on behalf of a client 103. In this way, a network service device 105 executing a network service 121 can perform throttling of its own requests according to policies 147 defined and stored in the data store 145. Accordingly, the request throttling server 125 can transmit such an authorization to a request throttling client 141 as well as one or more request throttling policies that are tailored for the network service device 105 and/or network service 121. The request throttling server 125 can determine, for example, how many additional network service devices 105 in the networked environment 100 are executing a particular network service 121 and generate a request throttling policy that allocates a proportionate amount of capacity to the network service device 105.

For example, if the request throttling server 125 determines that there are ten network service devices 105 executing a particular network service 121, and the request throttling server 125 also determines that a policy is defined that sets a threshold usage rate for a particular network service 121 that cannot be exceeded, the request throttling server 125 can transmit an authorization with a request throttling policy that assigns the network service 121 one tenth of the usage rate specified by the policy. Such a request throttling policy can be cached in the network service device 105 so that, when the network service 121 invokes the request throttling client 141 to determine whether it can, according to the throttling policies 147, accept or reject a request for network service 121 resources, the request throttling client 141 can retrieve the cached request throttling policy to determine whether the request should be approved or denied. In other embodiments, the request throttling client 141 can request a throttling policy from the request throttling server 125 and/or from the request throttling management application each time it needs to analyze a request to make a throttling determination.

Reference is now made to FIG. 2, which depicts the flow of data between various components in the networked environment 100 of FIG. 1 according to various embodiments of the disclosure. A client application 119 (FIG. 1) can initiate a request for a network service 121 (FIG. 1). In the depicted example, in order for a network service 121 to process the request from the client application 119, the network service 121 can invoke the request throttling client 141 to facilitate making a throttling determination for the request. As noted above, the request throttling client 141 can be a separate application executed in a network service device 105 (FIG. 1), or it can be a software library, class, or function that is provided within or accessible to the network service 121 that the network service 121 can invoke to determine whether a request should be processed or rejected. In one embodiment, by way of illustration only, the request throttling client 141 can comprise an API with a function such as the following pseudocode:

Boolean handleRequest(string API, string clientServiceName, string IPAddress, string requestIdentifier; string requestedService)

Accordingly, in the above example, the network service 121 can invoke the above function, which can be provided in a library, class, etc., in order to determine whether a request from a client application 119 should be processed. In the example of FIG. 2, invoking the request throttling client 141 causes a request having the parameters passed to the API to be generated and transmitted to the request throttling server 125. Upon receiving the request from the network service 121, the request throttling server 125 can extract parameters from the request and request a policy from the request throttling management application 143 that matches or corresponds to at least one of the extracted parameters.

The request throttling management application 143 can then transmit at least one policy that corresponds to the extracted parameters, and the request throttling server 125 can enforce the throttling policies by either approving or disapproving the request. The policies corresponding to the request can also be cached within the request throttling system 101 and the request throttling server 125 can be configured to retrieve policies corresponding to the request from such a cache to improve performance of the server. If the request throttling server 125 approves the request, it can transmit a throttling determination to the request throttling client 141, and the network service 121 can process the request for network service 121 resources from the client application 119.

A policy provided by the request throttling management application 143 is defined by at least one or more parameters which correspond to the parameters of a request to which the policy is applied. A throttling policy can include wildcards so that the policy may be applied to various requests that may share the same or similar parameters. Additionally, the policy is also defined by thresholds and/or rules which determine whether the request throttling server 125 and/or the request throttling client 141 approve or deny a request from a client application 119 for network service 121 resources. Accordingly, a throttling policy can define rate threshold policies, such as a request rate at any given time, an average request rate over a period of time, etc. These rate threshold policies can be applicable to any of the dimensions that are represented by a request parameter. In other words, a rate threshold policy can apply to a network service 121 requested by a client application 119, so that a request rate of a network service 121 is limited to a certain threshold, regardless of which application is requesting access to the service. A rate threshold policy can also apply to the requesting client application 119, so that a given client application 119, which can be identified with an identifier in a request parameter, is limited to a certain request rate defined by the policy.

A throttling policy can also be defined by absolute thresholds, which can specify non-rate thresholds and can also be associated with a particular period of time. Absolute threshold policies can include, for example, a total number of requests over a given period of time, and can be applicable to any of the dimensions that are represented by a request parameter. Like a rate threshold policy, an absolute threshold policy can apply to a network service 121 requested by a client application 119, so that an absolute number of requests over a period of time is limited to a certain threshold, regardless of which application is requesting access to the service. An absolute threshold policy can also, in one example, apply to the requesting client application 119, so that a given client application 119, which can be identified with an identifier in a request parameter, is limited to a certain number of requests over a given period of time defined by the policy. It should also be appreciated that a throttling policy can include any combination of the above.

Upon retrieving a throttling policy, the request throttling server 125, in the example of FIG. 2, can make a throttling determination based at least upon the throttling policy and the parameters extracted from a particular request. Upon making a throttling determination, which can take the form of an approval or denial of access to a requested network service 121, the request throttling server can transmit a response to the request throttling client 141, which can subsequently cause the network service 121 to transmit a response to the client application 119 initiating the request for the network service 121. If the request is denied, the network service 121 can transmit a denial message or an error message. If the request is approved, the network service 121 can process the request and transmit an appropriate response to the client application 119. The request throttling server 125 can also retrieve usage data 149 and/or request data 151 from the request throttling management application 143 to facilitate making a throttling determination. In the above example API where a Boolean response is defined as a return value for the handleRequest function call, the request throttling client 141 can return a "true" value if the request for a particular network service 121 is granted and a "false" value if the request for the network service 121 is denied. In other words, the handleRequest function call can return a "false" value if access to the network service 121 is being throttled based upon the identity of the requested network service 121, the identity of the client application 119, and/or other parameters in a particular request as can be appreciated.

Reference is now made to FIG. 3, which depicts an alternative example of data flow between the components of FIG. 1 in which access to a network service 121 (FIG. 1) is throttled according to embodiments of the disclosure. In the depicted example, a request throttling client 141 executed and/or invoked by a network service 121 can make a throttling determination based at least upon a throttling policy received from the request throttling server 125. The request throttling server 125, in order to facilitate throttling of requests for network services 121 in a networked environment 100, can grant certain network service devices 105 and/or network services 121 with the authority to make throttling determination regarding requests for network service 121 resources received from a client application 119. Accordingly, rather than acting as a conduit to a request throttling server 125 that will make a throttling determination for a given request, the request throttling client 141 can make a throttling determination with regard to a client application 119 request for a network service 121.

As noted above, the request throttling client 141 can be a separate application executed in a network service device 105 (FIG. 1) or it can be a software library, class, or function that is accessible to the network service 121 that can either make a throttling determination or transmit a request to a request throttling server 125, which can make a throttling determination on its behalf. Assuming for the sake of explanation that the request throttling client 141 comprises an API with a function such as in the pseudocode described above, the network service 121 can invoke the above function, which can be provided in a library, class, etc., in order to request access to the network service 121 described by "requestedService." In the example of FIG. 3, invoking the request throttling client 141 authorized to make a throttling determination attempts to locate at least one throttling policy corresponding to the request parameters.

Figure 4:
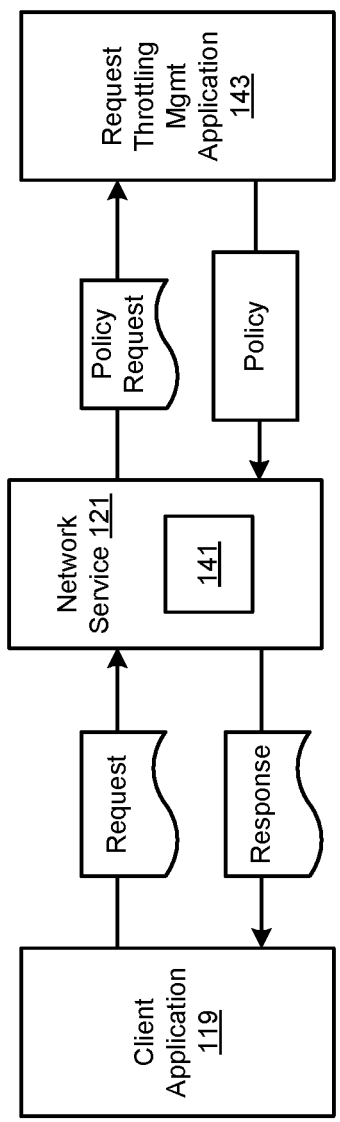
FIG. 4 is a drawing of an example of data flow between components in the networked environment of FIG. 1 according to various embodiments of the present disclosure.

If a corresponding request throttling policy is not cached in the request throttling client 141 or on the network service device 105, then the request throttling client 141 can request one or more throttling policies applicable to the request parameters from the request throttling sever 125. Accordingly, the request throttling server 125, if corresponding policies are not cached therein, can request corresponding policies from the request throttling management application 143, which can transmit at least one corresponding policy to the request throttling server 125, which can then transmit the policies to the request throttling client 141. FIG. 4 depicts an alternative embodiment where a request throttling client 141 can request a throttling policy directly from the request throttling management application 143, which, as noted above, can retrieve a corresponding policy 147 from the data store 145 by matching parameters in a request with parameters constraints defined in a policy 147.

Upon locating throttling policies that correspond to the request for a network service 121 initiated by the client application 119, the request throttling client 141 can apply the policies to determine whether the request should be granted or denied. To facilitate a throttling determination, the request throttling client 141 can also retrieve usage data 149 and/or request data 151 from the request throttling server 125 and/or request throttling management application 143.

In some embodiments, the request throttling server 125 can provide the network service 121 and/or request throttling client 141 with the various throttling policies relevant to requests for the network service 121 received from a client application 119 when an authorization for the network service 121 to perform its own throttling determinations is transmitted. Accordingly, in one example, the request throttling client 141 can determine whether an appropriate request throttling policy is cached within the network service device 105. If an applicable policy is not cached, then the request throttling client 141 can approve and process the request from a client application 119.

Figure 5:
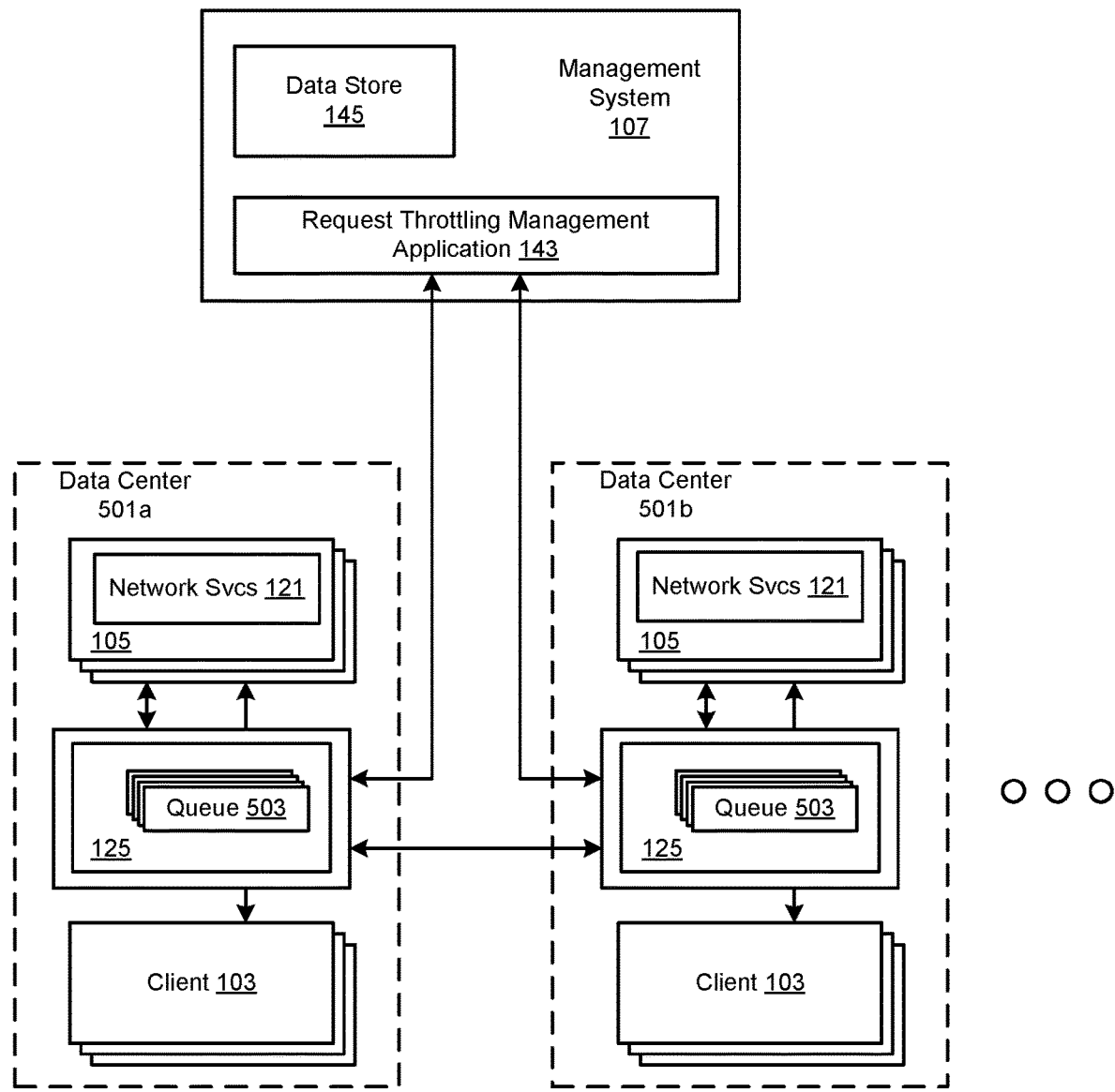
FIG. 5 is a drawing of an alternative configuration of the components shown in FIG. 1 according to various embodiments of the present disclosure.

Reference is now made to FIG. 5, which depicts an alternative configuration of the components of FIG. 1 according to various embodiments of the disclosure. FIG. 5 illustrates an example of throttling of requests for network services 121 in an environment involving multiple data centers 501 that may be disparately located. In such an environment, the request throttling server 125 and/or request throttling management application 143 can facilitate throttling of access to network services 121 across multiple data centers 501, where clients 103 and network service devices 105 on which network services 121 are executed are located across the various data centers. Additionally, in order to handle an expected level of request traffic, it may be desirable to provide one or more request throttling system 101 as well as multiple network service devices 105 executing network services located in multiple data centers 501. Accordingly, a request throttling server 125 can throttle requests to network services 121 from multiple clients 103. Additionally, multiple request throttling servers 125 can be employed in tandem so that requests from multiple clients 103 can be funneled to a particular data center and appropriately throttled.

In such an environment, request throttling policies may apply to a particular client application 119 and/or a network service 121, for example, and each may be executed on multiple clients 103 and network service devices 105 that are located across various data centers 501. As one example, a request throttling policy may specify that a client application 119 identifier cannot exceed a threshold request rate. However, the clients 103 executing the client application 119 may be located in different data centers 501 and may be configured to access different request throttling servers 125 located in their respective data centers 501.

As noted above, the various request throttling servers 125 can cache throttling policies 147, usage data 149 and/or request data 151 in order to make throttling determinations without having to request such data from the request throttling management application 143 for each incoming request. Therefore, the request throttling server 125 can employ a reporting mechanism to report usage data 149 and/or request data 151 to other request throttling servers 125, which can update cached data accordingly. When a request from a client application 119 for network service 121 resources is processed by a request throttling server 125 and a throttling determination is made, the request throttling server 125 can generate a reporting object corresponding to the parameters extracted from the request and transmit the reporting object to other request throttling servers 125 in addition to the request throttling management application 143. In the example discussed above in reference to FIG. 1, in one embodiment, the request throttling server 125 can generate a reporting object that contains fields corresponding to the various parameters of the request. The request throttling server 125 can then update its cached usage data 149 and/or request data 151 with the data represented by the reporting object. A request throttling policy applicable to a request can also specify whether a request having parameters matching the policy definitions of a policy should be reported. In this way, request throttling policies can control the amount of reporting activity that a request throttling server 125 handles.

The request throttling server 125 can also employ reporting queues 503 to facilitate reporting of reporting objects to other request throttling servers 125 and the request throttling management application 143. Reporting queues can be employed so that the request throttling server 125 does not have to report a result of each throttling determination when each request is processed. A request throttling server can generate a first reporting queue 503 configured to facilitate reporting to another request throttling server 125 and a second reporting queue 503 to facilitate reporting to the request throttling management application 143. These separate reporting queues 503 can be tuned to initiate reporting of reporting objects at varying frequencies. For example, a reporting queue 503 configured to report to another request throttling server 125 can be tuned to flush its queue more frequently than a reporting queue 503 configured to report reporting objects to the request throttling management application 143. Reporting queues 503 can be differently tuned in this way because reporting usage data 149 and/or request data 151 to another request throttling server 125 can be considered to have a higher priority than reporting data to the request throttling management application 143.

Figure 6A:
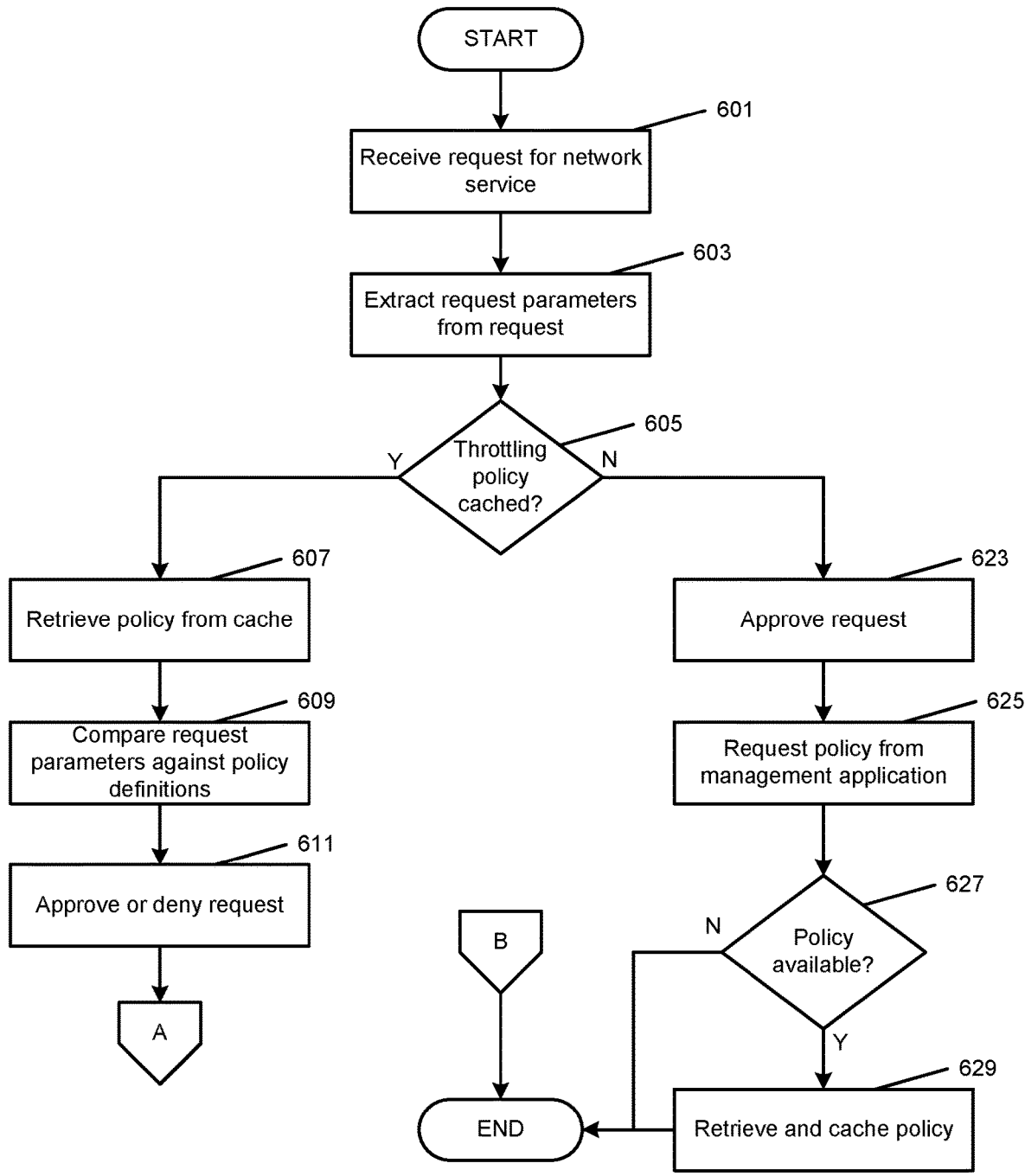
FIG. 6A is a flowchart that illustrates one example of execution of the request throttling server in the networked environment of FIG. 1 according to various embodiments of the present disclosure.
Figure 6B:
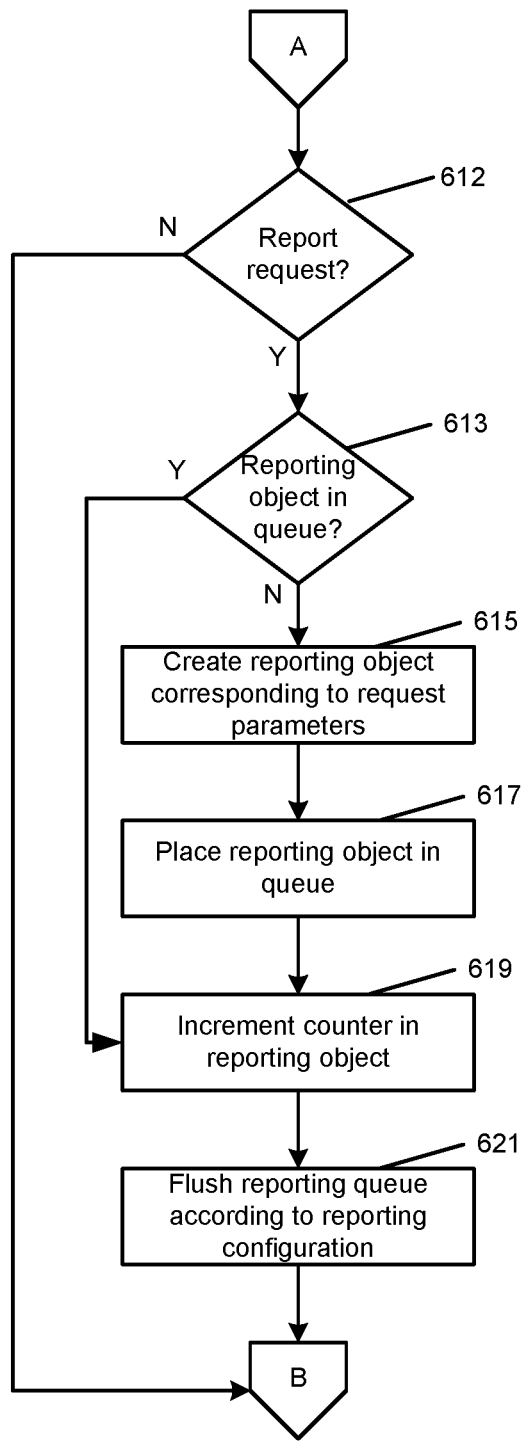
FIG. 6B continues the flowchart of FIG. 6A according to various embodiments of the present disclosure.

Referring next to FIGS. 6A and 6B, shown is a flowchart that provides one example of the operation of a portion of the request throttling server 125 according to various embodiments. It is understood that the flowchart of FIGS. 6A and 6B provides merely an example of the many different types of functional arrangements that may be employed to implement the operation of the portion of the request throttling server 125 as described herein. As an alternative, the flowchart of FIGS. 6A and 6B may be viewed as depicting an example of steps of a method implemented in the request throttling system 101 (FIG. 1) according to one or more embodiments.

Beginning with box 601, the request throttling server 125 receives a request from a request throttling client 141 (FIG. 1) to access a network service 121 (FIG. 1). Request parameters are extracted from the request so that one or more throttling policies can be identified in box 603. In box 605, the request throttling server 125 can identify whether a throttling policy having parameters matching the request parameters is cached in the request throttling server 125. If throttling policies corresponding to the extracted request are cached in the request throttling server 125, in box 607 the one or more throttling policies can be retrieved from the cache. In box 609, the request parameters can be compared against the policy definitions. In box 611, the request can be approved or denied depending upon the comparison between the request parameters and the policy definitions and the process can proceed to jump block A, continued in FIG. 6B. If a request is approved, the request throttling client 141, if executed in a network service 121 and/or network service device 105, can cause the network service 121 to process a request from a client application 119.

From jump block A in FIG. 6B, in box 612, the request throttling server 125 can determine whether the request should be reported. As noted above, a request throttling policy can define whether a request matching its policy definitions should be reported. If the policy specifies that the request should not be reported, then the process can proceed to jump block B, which refers back to FIG. 6A, where the process ends. If the request throttling server 125 determines in box 612 that the request should be reported, then in box 613, the request throttling server 125 can determine whether a reporting object corresponding to the request parameters is in the appropriate reporting queues of the request throttling server 125.

If the request throttling server 125 is in a multi-data center and/or a multi-server environment, it may have reporting queues associated with the other request throttling servers 125 in its environment as well as a reporting queue associated with the request throttling management application 143. If a reporting object is not in one or more of the various reporting queues in a request throttling server 125, then in box 615 and box 617, reporting objects for the reporting queues can be created and placed into the reporting queues. In box 619, a counter in the reporting object can be incremented, which corresponds to counting the request that was received and processed by the request throttling server 125. In some embodiments, the counter can be incremented only if the request was approved by the request throttling server 125. The process can then proceed to jump block B, which refers back to jump block B in FIG. 6A, where the process ends.

If, in box 605, request throttling policies are not cached in the request throttling server 125, then in box 623, the request throttling server 125 can approve the request and transmit an approval to a request throttling client 141 corresponding to the network service 121 in which the request throttling client 141 is invoked. In the depicted embodiment, the request can be approved to improve performance and/or throughput of the request throttling server 125 so that a client application 119 does not have to wait for the request throttling server 125 to retrieve a policy to make a throttling determination from the request throttling management application 143, which can be retrieved and cached in subsequent steps of the depicted process for subsequent requests having the same or similar parameters. In block 625, the request throttling server 125 can request a policy from the request throttling management application 143. In box 627, if policies corresponding to the request parameters are available in the data store 145, they are transmitted from the request throttling management application 143 to the request throttling server 125 and cached in box 629, after which the process ends.

In some embodiments, the request throttling server 125 can simply approve the request in box 623 and then end the depicted process. As one example, the request throttling server 125 can, upon startup or at another time, retrieve request throttling policies from the request throttling management application 143 and cache the policies in the request throttling system 101. Accordingly, the request throttling server 125 can avoid making requests to the request throttling management application 143 as a part of handling any given request, and rely on the policies it has cached. However, in other embodiments, it should be appreciated that the request throttling server 125 can request one or more policies that correspond to the parameters of the request from the request throttling management application 143 and only approve or deny the request after a corresponding policy is located and a throttling determination is made.

Additionally, in the depicted example, the request throttling server 125 does not initiate reporting of the request of a request throttling policy applicable to the request cannot be located because, in the depicted embodiment, the request throttling policy can specify whether the request should be reported. However, in some embodiments, the request throttling server 125 can also initiate reporting of the request for which a policy cannot be located by following the reporting pipeline depicted in FIG. 6B.

Figure 7:
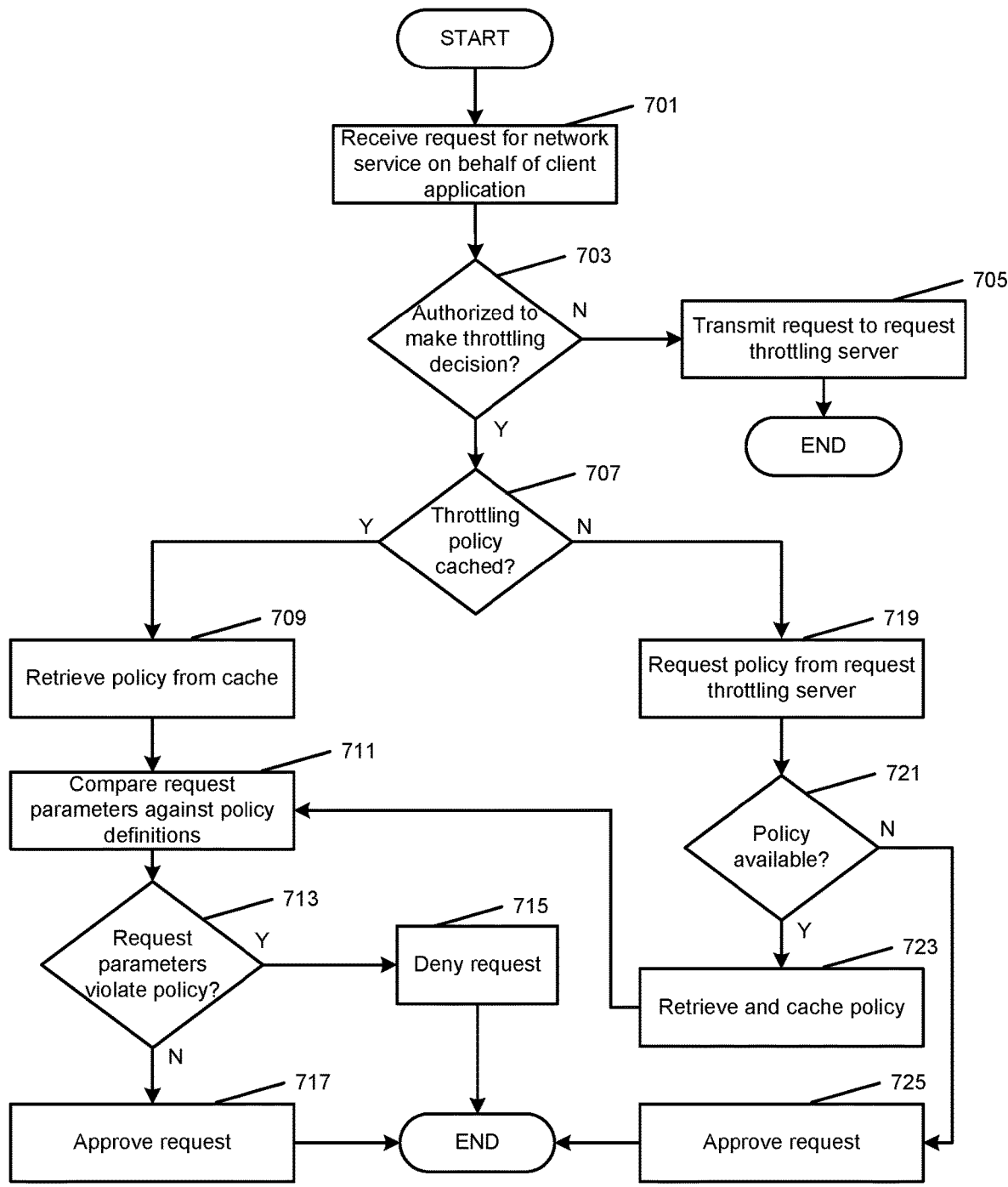
FIG. 7 is a flowchart that illustrates one example of execution of the request throttling client in the networked environment of FIG. 1 according to various embodiments of the present disclosure.

Referring next to FIG. 7, shown is a flowchart that provides one example of the operation of a portion of the request throttling client 141 according to various embodiments. It is understood that the flowchart of FIG. 7 provides merely an example of the many different types of functional arrangements that may be employed to implement the operation of the portion of the request throttling client 141 as described herein. As an alternative, the flowchart of FIG. 7 may be viewed as depicting an example of steps of a method implemented in the client 103 (FIG. 1) according to one or more embodiments.

First, in box 701, a request to access a network service 121 (FIG. 1) can be received in the request throttling client 141 on behalf of a client application 119 (FIG. 1). If, in box 703, the request throttling client 141 determines that it is not authorized to make a throttling determination for a request corresponding to the parameters used to invoke the request throttling client 141 on its own, then the generated request is transmitted to a request throttling server 125, which can make a throttling determination and transmit either an approval or denial to the request throttling client 141. If the request throttling client 141 determines that it is authorized to make a throttling determination for the request, then in box 707 it is determined whether throttling policies corresponding to the request parameters are cached in the request throttling client 141. Policies are retrieved from a cache in box 709 and the request parameters are compared against policy definitions in box 711. If it is determined in box 713, based at least upon usage data 149 and request data 151, that the request parameters violate the one or more policies, then in box 715 the request is denied by the request throttling client 141. If the request parameters do not violate the policies, then the request is approved in box 717.

If, in box 707, it is determined that the throttling policies corresponding to the request parameters are not cached in the request throttling client 141, then in box 719, policies corresponding to the parameters are requested from the request throttling server 125. If policies are available that correspond to the parameters in box 721, they are transmitted to and cached in the request throttling client 141 in box 723. Then, the process proceeds to apply or enforce the retrieved policies as described above. If a request throttling policy cannot be located, then the process proceeds to box 725, where the request is approved.

Figure 8:
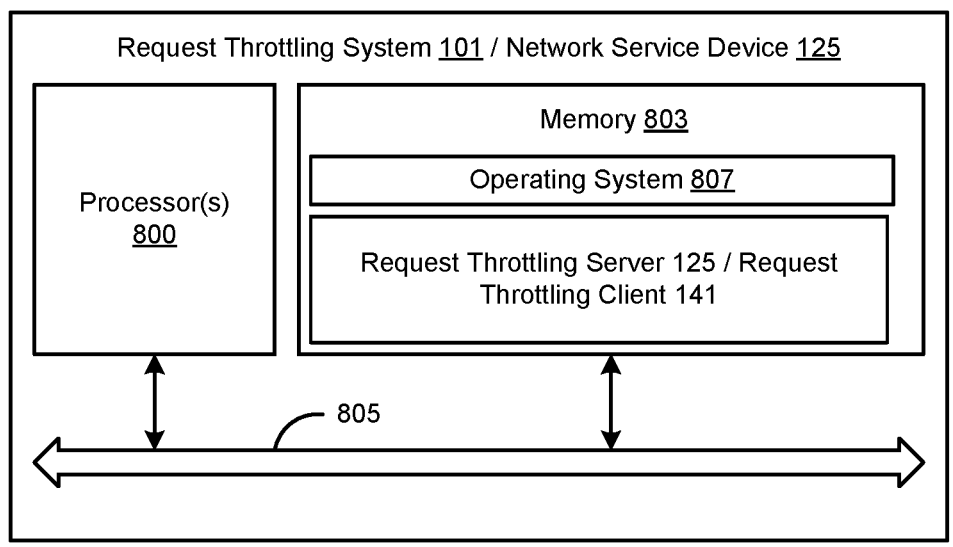
FIG. 8 is a schematic block diagram that provides one example illustration of a computing device employed to implement a request throttling server and/or request throttling client in the networked environment of FIG. 1 according to various embodiments of the present disclosure.

With reference to FIG. 8, shown is a schematic block diagram of the computing device or computing system which can be used to implement a request throttling system 101 and/or a network service device 105 according to an embodiment of the present disclosure. The depicted device computing device includes at least one processor circuit, for example, having a processor 800 and a memory 803, both of which are coupled to a local interface 805. To this end, the computing device may comprise, for example, at least one server computer or like device. The local interface 805 may comprise, for example, a data bus with an accompanying address/control bus or other bus structure as can be appreciated.

Stored in the memory 803 are both data and several components that are executable by the processor 800. In particular, stored in the memory 803 and executable by the processor 800 are request throttling server 125 and/or the request throttling client 141, and potentially other applications. In addition, an operating system may be stored in the memory 803 and executable by the processor 800. It is understood that there may be other applications that are stored in the memory 803 and are executable by the processors 800 as can be appreciated. Where any component discussed herein is implemented in the form of software, any one of a number of programming languages may be employed such as, for example, C, C++, C #, Objective C, Java, Java Script, Perl, PHP, Visual Basic, Python, Ruby, Delphi, Flash, or other programming languages.

A number of software components are stored in the memory 803 and are executable by the processor 800. In this respect, the term "executable" means a program file that is in a form that can ultimately be run by the processor 800. Examples of executable programs may be, for example, a compiled program that can be translated into machine code in a format that can be loaded into a random access portion of the memory 803 and run by the processor 800, source code that may be expressed in proper format such as object code that is capable of being loaded into a random access portion of the memory 803 and executed by the processor 800, or source code that may be interpreted by another executable program to generate instructions in a random access portion of the memory 803 to be executed by the processor 800, etc. An executable program may be stored in any portion or component of the memory 803 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 803 is defined herein as including both volatile and nonvolatile memory and data storage components. Volatile components are those that do not retain data values upon loss of power. Nonvolatile components are those that retain data upon a loss of power. Thus, the memory 803 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 800 may represent multiple processors 800 and the memory 803 may represent multiple memories 803 that operate in parallel processing circuits, respectively. In such a case, the local interface 805 may be an appropriate network 113 (FIG. 1) that facilitates communication between any two of the multiple processors 800, between any processor 800 and any of the memories 803, or between any two of the memories 803, etc. The local interface 805 may comprise additional systems designed to coordinate this communication, including, for example, performing load balancing. The processor 800 may be of electrical or of some other available construction.

Although the request throttling server 125 and/or request throttling client 141, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6A, 6B and 7 show the functionality and operation of an implementation of portions of the request throttling server 125 and request throttling client 141, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 800 in a computer system or other system. The machine code may be converted from the source code, etc. If embodied in hardware, each block may represent a circuit or a number of interconnected circuits to implement the specified logical function(s).

Although the flowcharts of FIGS. 6A, 6B and 7 show a specific order of execution, it is understood that the order of execution may differ from that which is depicted. For example, the order of execution of two or more blocks may be scrambled relative to the order shown. Also, two or more blocks shown in succession in FIGS. 6A, 6B and 7 may be executed concurrently or with partial concurrence. Further, in some embodiments, one or more of the blocks shown in FIGS. 6A, 6B and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the request throttling server 125 and the request throttling client 141, that comprises software or code can be embodied in any non-transitory computer-readable medium for use by or in connection with an instruction execution system such as, for example, a processor 800 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
   receiving, by a request throttling client, authorization from a request throttling server to make a determination to process a network service request received by a network service device corresponding to a network service independent of consulting the request throttling server, the network service request being received over a network on behalf of a client;

extracting, by the request throttling client, at least one request parameter from the network service request, wherein the at least one request parameter describes at least one of: a user or customer identifier associated with the client, a name or identifier of the network service, an API or function within the network service, or a marketplace identifier;

identifying, by the request throttling client, at least one throttling policy applicable to the at least one request parameter cached within the request throttling client, the at least one throttling policy obtained from the request throttling server with the authorization to make the determination to process the network service request;

identifying, by the request throttling client, usage data of the network service, the usage data cached within the request throttling client;

determining, by the request throttling client, whether the network service request should be granted based at least in part upon the at least one throttling policy and the usage data of the network service cached within the request throttling client, wherein the at least one throttling policy defines a particular amount of capacity to allocate to the network service device, wherein the usage data comprises data related to the at least one request parameter;

in response to determining that the at least one request parameter does not violate the at least one throttling policy, generating, by the request throttling client, a value indicating that the network service device should process the network service request; and processing, by the network service device, the network service request.

2. The method of claim 1, further comprising determining, by the request throttling client, that the at least one throttling policy is cached within the request throttling client.

3. The method of claim 1, further comprising:
determining, by the request throttling client, that the at least one throttling policy is not cached within the request throttling client; and
processing, by the request throttling client, the network service request in response to determining that the at least one throttling policy is not cached in the request throttling client.

4. The method of claim 3, further comprising requesting, by the request throttling client, at least one other throttling policy applicable to the at least one request parameter from the request throttling server.

5. The method of claim 4, further comprising receiving, by the request throttling client, the at least one other throttling policy applicable to the at least one request parameter to be cached.

6. The method of claim 5, further comprising applying, by the request throttling client, the at least one other throttling policy applicable to the at least one request parameter.

7. The method of claim 1, further comprising:
determining, by the request throttling client, that the at least one throttling policy is not cached within the request throttling client; and
requesting, by the request throttling client, the at least one throttling policy from the request throttling server.

8. The method of claim 1, wherein the request throttling client comprises an application programming interface (API) and the method further comprises invoking, by the network service, the request throttling client.

9. A system, comprising:
at least one computing device; and
a request throttling client executable in the at least one computing device, the request throttling client causing the at least one computing device to:
receive authorization from a request throttling server to make a determination to process a network service request received by a network service device corresponding to a network service independent of consulting the request throttling server, the network service request being received over a network on behalf of a client;
extract at least one request parameter from the network service request, wherein the at least one request parameter describes at least one of: a user or customer identifier associated with the client, a name or identifier of the network service, an API or function within the network service, or a marketplace identifier;
identify at least one throttling policy applicable to the at least one request parameter, the at least one throttling policy defining at least one policy for the at least one request parameter cached within the request throttling client, the at least one throttling policy obtained from the request throttling server with the authorization to make the determination to process the network service request;
retrieve the at least one throttling policy applicable to the at least one request parameter;
determine whether the network service request should be processed based at least in part upon the at least one throttling policy and usage data of the network service cached within the request throttling client, wherein the usage data comprises data related to the at least one request parameter; and
in response to determining that the at least one request parameter does not violate the at least one throttling policy, generate a value indicating that the network service device should process the network service request.

10. The system of claim 9, wherein the request throttling client further causes the at least one computing device to:
transmit, to a request throttling management application, the usage data on a periodic basis based at least in part upon a volume of requests and the periodic basis is adjusted at an inverse rate relative to the volume of requests.

11. The system of claim 9, wherein the request throttling client further causes the at least one computing device to transmit an error message in response to determining that the network service request is denied.

12. The system of claim 9, wherein the request throttling client further causes the at least one computing device to receive a message comprising credentials provided by a user.

13. The system of claim 12, wherein the request throttling client further causes the at least one computing device to return a Boolean response indicating that the user is authenticated.

14. The system of claim 9, wherein the network service facilitates an electronic commerce system and the at least one request parameter identifies a marketplace for which the network service is intended.

15. A method, comprising:
receiving, by a request throttling client executed in a computing device, a request to access a network service on behalf of a client independent of consulting the request throttling server, the request throttling client invoked by a network service device corresponding to the network service;
determining, by the request throttling client, that the request throttling client is authorized to make a throttling determination with respect to the request;
extracting, by the request throttling client, at least one request parameter from the request, wherein the at least one request parameter describes at least one of: a user or customer identifier associated with the client, a name or identifier of the network service, an API or function within the network service, or a marketplace identifier;
identifying, by the request throttling client, at least one throttling policy applicable to the at least one request parameter, the at least one throttling policy defining at least one policy for the at least one request parameter cached within the request throttling client, the at least one throttling policy obtained from the request throttling server with an authorization to make the determination to process the network service request;
determining, by the request throttling client, that the at least one throttling policy is cached in the request throttling client;
in response to determining that the at least one throttling policy is cached in the request throttling client, retrieving the at least one throttling policy from a cache in the request throttling client;
determining, by the request throttling client, whether the request should be granted based at least in part upon the at least one throttling policy and usage data of the network service cached within the request throttling client, wherein the usage data comprises data related to the at least one request parameter; and
in response to determining that the request should be granted, generating, by the request throttling client, a value indicating that the network service device should process the network service request.

16. The method of claim 15, wherein the authorization is received by the request throttling client from the request throttling server to make the throttling determination.

17. The method of claim 15, further comprising:
tracking, by the request throttling client, client request data associated with an internet protocol (IP) address associated with the client; and
denying, by the request throttling client, the request based at least in part upon the client request data.

18. The method of claim 15, further comprising processing, by the network service device, the request.

19. The method of claim 18, further comprising retrieving, by the request throttling client, updated usage data from the request throttling server.

20. The method of claim 18, further comprising:
determining, by the request throttling client, that the at least one throttling policy comprises a policy that defines an absolute request threshold of the client;
determining, by the request throttling client, that a historical request data associated with the client indicates that the absolute request threshold has been exceeded; and
denying, by the request throttling client, the request in response to determining that historical data associated with the client indicates that the absolute request threshold has been exceeded.

* * * * *